United States Patent [19]

Clark et al.

[11] 4,146,449

[45] Mar. 27, 1979

[54] PURIFICATION OF SILANE VIA LASER-INDUCED CHEMISTRY

[75] Inventors: John H. Clark; Robert G. Anderson, both of Los Alamos, N. Mex.

[73] Assignee: The United States of America as represented by the United States Department of Energy, Washington, D.C.

[21] Appl. No.: 865,348

[22] Filed: Dec. 28, 1977

[51] Int. Cl.² ............................................... B01J 1/10
[52] U.S. Cl. ...................... 204/157.1 R; 204/DIG. 11
[58] Field of Search .................. 204/157.1 R, DIG. 11

[56] References Cited

PUBLICATIONS

Ambartsumyan et al, Sov. J. Quantum Electron, vol. 7 No. 1 (Jan., 1977) pp. 96 & 97.

*Primary Examiner*—Howard S. Williams
*Attorney, Agent, or Firm*—Dean E. Carlson; Edward C. Waltersheid

[57] ABSTRACT

Impurities such as $PH_3$, $AsH_3$, and $B_2H_6$ may be removed from $SiH_4$ by means of selective photolysis with ultraviolet radiation of the appropriate wavelength. An ArF laser operating at 193 nm provides an efficient and effective radiation source for the photolysis.

8 Claims, No Drawings

PURIFICATION OF SILANE VIA LASER-INDUCED CHEMISTRY

BACKGROUND OF THE INVENTION

The invention described herein relates to a method of purifying silane and more particularly to a method of purifying silane by photolyzing impurities therein and removing the photolysis products.

The technique of laser photochemistry are notable in their ability to selectively excite a single component in a mixture of isotopic or chemical species. The use of laser photochemistry for isotope separation has been well chronicled. However, only recently has attention been given to the possibility of chemical purification using such techniques. The photochemical separation of rare earth mixtures in solution has been achieved with both conventional and laser light sources. In the gas phase, laser-induced conversion of $C_2H_4Cl_2$ and $CCl_4$ into $C_2H_2$, $C_2H_3Cl$, HCl, $C_2Cl_4$, and $C_2Cl_6$ in the presence of $AsCl_3$ has been demonstrated. This technique could, in principle, lead to a means of purifying the $AsCl_3$ of $C_2H_4Cl_2$ and $CCl_4$ if it were followed by a conventional physical separation process for the photolysis products.

Exceedingly high purity materials are required for the success of most semiconductor manufacturing processes. Impurity levels on the order of parts-per-billion can adversely affect device performance. As a result, a great deal of effort has been expended in devising methods of purification for materials used in the semiconductor industry. Heretofore, virtually all such schemes have shared a common feature: all of the material being purified is subjected to the same process. Since the impurities are normally present in only small amounts to begin with, it would be desirable to achieve further purification by some technique that would act only on the impurities while leaving the bulk of the reagent virtually unchanged.

Electronic grade silane ($SiH_4$) is in demand for use in the preparation of semiconductor devices and solar cells. The principal impurities which degrade the performance of devices fabricated using electronic grade $SiH_4$ are compounds which give rise to n- and p- type carriers. Thus, the presence of volatile compounds of the elements of Groups III and IV of the Periodic Table is especially pernicious. For $SiH_4$, the major impurities of these types are phosphine ($PH_3$), arsine ($AsH_3$), and diborane ($B_2H_6$).

SUMMARY OF THE INVENTION

We have now found that impurities such as $PH_3$, $AsH_3$, and $B_2H_6$ may readily be removed from silane by (a) irradiating silane vapor with ultraviolet radiation of a wavelength such that the absorption cross section of the impurity species is larger than that of $SiH_4$ and of sufficient intensity to photolyze impurities therein, and (b) removing the photolysis products from the silane. The 193 nm radiation from an ArF laser is quite suitable for this purpose.

Photolysis of the impurities results in products which are easily removed from the silane by standard physical or chemical techniques. While conventional purification methods exploit the small differences between the bulk physical properties of the contaminants and the silane, and thus achieve correspondingly small separation selectivity, the method of the present invention utilizes the differences in molecular properties to achieve separation selectivities which can be quite high.

DESCRIPTION OF THE PREFERRED EMBODIMENTS

The onset of absorption and subsequent photochemistry in $SiH_4$ occurs near 185 nm. This is such a high energy that nearly any contaminant species which might be present may be preferentially removed by photolysis in the ultraviolet at energies which do not affect the silane in any significant fashion. Various aspects of the ultraviolet photochemistry of $PH_3$, $AsH_3$, and $SiH_4$ have been reported in the literature. There is some disagreement concerning the primary photolytic step for $PH_3$, $SiH_4$, and $B_2H_6$, as well as the subsequent free radical reactions for all these compounds. There is, however, very good agreement that the final photolysis products for $PH_3$, $AsH_3$, and $B_2H_6$ are solid or polymeric materials. Thus, if an appropriate radiation is used which can be made to selectively excite the $PH_3$, $AsH_3$, and $B_2H_6$ to dissociation but which would not adversely affect the $SiH_4$, these contaminants can effectively be removed from vapor phase $SiH_4$.

The photochemical conversion of the impurity species from gas phase compounds to solids can result in a dramatic increase in the efficiency of a conventional physical separation process such as distillation, due to the low volatility of solids relative to that of vapors. Indeed, it may often be the case that solid products have such low vapor pressure that even at room temperature they are effectively removed from vapor phase $SiH_4$. For example, in these experiments, this is precisely what happens. As one goes to lower levels of impurity, it may be necessary to perform a lower temperature distillation. Since the selectivity of the photochemical step may also be improved by cooling the photolysis cell (see below), it may be that both photochemical conversion and distillation can be carried out in the same reaction vessel.

The ArF laser provides a powerful and efficient ultraviolet source at 193 nm. To determine if $PH_3$, $AsH_3$, and $B_2H_6$ could be selectively excited with an ArF laser in the presence of $SiH_4$, absolute absorption cross sections were measured for each of the four species over the region 190-202 nm. Since the spectra of each of these compounds in this wavelength region are pure continua, optical excitation results in dissociation. The spectra were obtained using a Cary model 17D spectrophotometer. To avoid absorption due to the Schumann-Runge bands of atmospheric $O_2$, both the sample and reference compartments were continuously purged with dry $N_2$. The absorption cell consisted of a 2 cm i.d. pyrex tube 10 cm long, with a Suprasil window o-ring-sealed to each end. The $SiH_4$ and $PH_3$ (Linde) as well as the $AsH_3$ (Matheson) were electronic grade. The $B_2H_6$ was synthesized by Prof. R. T. Paine of the University of New Mexico. All of the gases were analyzed and found to be pure by gas chromatography. Their infrared spectra also did not show any sign of impurities. The gas pressures were measured with either a variable reluctance manometer (Validyne) or a precision Bourdon gauge (Texas Instruments). Since all of the gases studied are fairly reactive, a grease-free vacuum system was used. It was also necessary to carefully passivate the entire gas handling system to ensure reproducible results. However, once thoroughly passivated, a cell could be filled with $SiH_4$, $AsH_3$, or $PH_3$ and left for 24 hours with no detectable loss of gas. With $B_2H_6$, less than 5% was lost during a 24-hour period. Since the time scale for all experiments was less than one hour, this slow loss of $B_2H_6$ did not affect the results. Ultraviolet spectra were taken of the empty cell both before and after the $SiH_4$, $PH_3$, $AsH_3$, and $B_2H_6$ spectra. These blank scans were identical and allowed correction for the small absorption of the cell windows. Since the gas pressure, cell length, and absolute absorbance were all measured, the absolute cross sections could be calculated. The ratio of absorption cross sections of $PH_3$, $AsH_3$, and $B_2H_6$ relative to that of $SiH_4$ (i.e., the excitation selectivity), as well as the absolute cross sections for $SiH_4$ are given in Table I for the spectral region 190-202 nm. These data show that $PH_3$, $AsH_3$, and $B_2H_6$ can indeed be preferentially excited in the presence of $SiH_4$ with the 193 nm ArF laser.

To determine how well these high excitation selectivites can be carried through into actual product separations, photolysis experiments were performed on binary mixtures of $SiH_4$ with $PH_3$, $AsH_3$, or $B_2H_6$. For the $SiH_4$:$PH_3$ and $SiH_4$:$AsH_3$ mixtures, the quantitative analysis was performed using a gas chromatograph (Varian 90-P) equipped with a 250 cm long Porapak-Q column and a thermal conductivity detector. For $SiH_4$:$B_2H_6$ mixtures, an infrared spectrophotometer (Beckman IR-20A-X) was used for analysis. For both detection methods numerous calibration checks were made for linearity and reproducibility. The precision of each was always better than three percent. The procedure for a typical photolysis experiment was to fill the photolysis cell with the desired gas mixture and condense that mixture into a side arm with liquid $N_2$. The side arm was then closed off and the cell was placed in front of the 193 nm ArF laser.

Table I

Ratio of Absolute Absorption Cross-sections ($\sigma$) of $PH_3$, $AsH_3$ and $B_2H_6$ Relative to that of $SiH_4$, and the Absolute Absorption Cross-section of $SiH_4$ over the Region 190-202 nm.

| Wavelength (nm) | $\sigma PH_3/SiH_4$ | $\sigma AsH_3/SiH_4$ | $\sigma B_2H_6/SiH_4$ | $SiH_4$ ($cm^2$) |
| --- | --- | --- | --- | --- |
| 190 | $7.7 \times 10^3$ | $1.0 \times 10^4$ | $1.5 \times 10^2$ | $2.2 \times 10^{-21}$ |
| 191 | $8.9 \times 10^3$ | $1.2 \times 10^4$ | $1.5 \times 10^2$ | $1.8 \times 10^{-21}$ |
| 192 | $9.3 \times 10^3$ | $1.3 \times 10^4$ | $1.6 \times 10^2$ | $1.5 \times 10^{-21}$ |
| 193 | $10^4$ | $1.5 \times 10^4$ | $1.8 \times 10^2$ | $1.2 \times 10^{-21}$ |
| 194 | $1.2 \times 10^4$ | $1.8 \times 10^4$ | $1.9 \times 10^2$ | $9.4 \times 10^{-22}$ |
| 195 | $1.4 \times 10^4$ | $2.1 \times 10^4$ | $2.1 \times 10^2$ | $7.3 \times 10^{-22}$ |
| 196 | $1.5 \times 10^4$ | $2.5 \times 10^4$ | $2.3 \times 10^2$ | $5.7 \times 10^{-22}$ |
| 197 | $1.7 \times 10^4$ | $2.7 \times 10^4$ | $2.5 \times 10^2$ | $4.4 \times 10^{-22}$ |
| 198 | $1.8 \times 10^4$ | $3.2 \times 10^4$ | $2.7 \times 10^2$ | $3.4 \times 10^{-22}$ |
| 199 | $2.0 \times 10^4$ | $3.6 \times 10^4$ | $2.8 \times 10^2$ | $2.7 \times 10^{-22}$ |
| 200 | $2.3 \times 10^4$ | $4.2 \times 10^4$ | $3.1 \times 10^2$ | $2.0 \times 10^{-22}$ |

Typical laser output energies were 20 nJ at a 1-2 Hz repetition rate, as measured on a pyroelectric joulemeter (Gen Tec). The beam from this laser has a rectangular cross section, roughly 2 cm × 1 cm. The pulse width was typically 25 ns. The general design and construction of this type of laser have been described previously in the literature. By first measuring the laser energy with the cell in place and then opening the side arm to admit the sample while observing the transmitted laser energy, a rough estimate of the absorbed energy could be made. After photolysis, the sample was condensed either into a sample injection loop for subsequent gas chromatographic analysis, or into a cell for infrared analysis. Since $H_2$, along with some solid material, is a photolysis product, liquid He was used in order to quantitatively condense the volatile portion of the sample. The accuracy of the entire experimental procedure was confirmed using unphotolyzed samples, which were otherwise treated in precisely the same manner as the photolyzed samples. In order to test the feasibility of separation under conditions where virtually all collisions of the dissociation products would be with $SiH_4$, samples in which the $SiH_4$:contaminant ratio was 100:1 were photolyzed under conditions where each laser pulse excited less than one percent of the impurity molecules present in the cell. The results of those experiments are presented in Table II. They clearly show that $SiH_4$ may be purified of $AsH_3$, $PH_3$, and $B_2H_6$ with high selectivity. Within experimental error, the fraction of $SiH_4$ removed was the same for all three impurity species.

Experiments were also performed at $SiH_4$:contaminant ratios of 10:1. In these experiments a larger fraction of $SiH_4$ is destroyed, so a more accurate measure of the number of $SiH_4$ molecules removed for each contaminant molecule removed could be made.

Table II

RESULTS OF ArF LASER PHOTOLYSIS OF VARIOUS 100:1 $SiH_4$ CONTAMINANT MIXTURES

| Contaminant Species | Fraction of $SiH_4$ Photolyzed | Fraction Of Contaminant Species Photolyzed |
| --- | --- | --- |
| $AsH_3$[a] | 0.01 | >0.99 |
| $PH_3$[a] | 0.06 | 0.44 |
| $B_2H_6$[b] | 0.02 | 0.42 |

[a] $SiH_4$ pressure 10 torr
[b] $SiH_4$ pressure 100 torr

These data, along with the quantum yields for destruction of the contaminant species are given in Table III. Only for $PH_3$ has the quantum yield been previously measured. Given the inaccuracy inherent in the method of measuring the energy absorbed, the quantum yield obtained, 0.35, compares quite favorably with the literature value of 0.56. The fact that approximately one $SiH_4$ molecule is lost per contaminant molecule dissociated augurs well for maintaining the high excitation selectivity. The reaction $$H + SiH_4 \rightarrow H_2 + SiH_3, \quad (1)$$

is known to be quite fast, and the primary photolysis steps for $PH_3$, $AsH_3$, and $B_2H_6$ are thought to include $$PH_3 + h\nu \rightarrow PH_2 + H, \quad (2)$$

$$AsH_3 + h\nu \rightarrow AsH_2 + H, \quad (3)$$

and $$B_2H_6 + h\nu \rightarrow B_2H_5 + H. \quad (4)$$

Table III

The Number of $SiH_4$ Molecules Removed For Each Contaminant Molecule Removed, And The Quantum Yields For Removal Of The Contaminant Species

| Contaminant Species | Number of $SiH_4$ Molecules Lost Per Contaminant Molecule Removed | Quantum Yield For Removal |
| --- | --- | --- |
| $PH_3$[a] | 1.2 | 0.35 |
| $AsH_3$[a] | 1.3 | 0.42 |
| $B_2H_6$[b] | 1.1 | 0.15[c] |

[a] $SiH_4$ pressure 1 torr
[b] $SiH_4$ pressure 10 torr
[c] Lower limit

The number of $SiH_4$ molecules lost per contaminant molecule dissociated, as shown in Table III, suggests that an H atom produced via reaction (2), (3), or (4)

abstracts an H from $SiH_4$ and that very little further free radical scrambling occurs, even under conditions where the $SiH_4$ is in great excess. Thus, it appears that the controlling factor in determining the achievable selectivity of removal, even at the 10–100 ppb level useful for practical application, is the excitation selectivity. Although the demonstrated excitation selectivities shown in Table I are already quite high, they may be improved still further. Since the $SiH_4$ absorption which influences the selectivity is on the long wavelength tail of the main $SiH_4$ absorption band, and since the cross section in this long wavelength region is very weak relative to that at band center, the $SiH_4$ absorption at 193 nm appears to be due primarily to absorption from the small fraction of $SiH_4$ molecules which are not in the ground vibrational state at room temperature. Thus, cooling the gas can be expected to improve the excitation selectivities.

The foregoing examples are merely illustrative of preferred embodiments of the invention and do not limit in any way the scope of the invention. It will be understood that the scope of the invention is as set forth in the Summary of the Invention and encompassed by the broad claims appended hereto.

What we claim is:

1. A method of purifying silane which comprises (a) irradiating said silane with ultraviolet radiation of sufficient intensity to photolyze impurities therein, and (b) removing the photolysis products from said silane.

2. The method of claim 1 wherein said ultraviolet radiation is in the spectral range of 190 to 202 nm.

3. The method of claim 2 wherein said ultraviolet radiation is 193 nm radiation from an ArF laser.

4. The method of claim 1 wherein said silane is cooled before it is irradiated.

5. A method of removing $PH_3$, $AsH_3$, and $B_2H_6$ from silane which comprises (a) irradiating said silane with ultraviolet radiation of sufficient intensity to photolyze said $PH_3$, $AsH_3$, and $B_2H_6$, and (b) removing the photolysis products from said silane.

6. The method of claim 5 wherein said ultraviolet radiation is in the spectral range of 190 nm to 202 nm.

7. The method of claim 5 wherein said ultraviolet radiation is 193 nm radiation from an ArF laser.

8. The method of claim 5 wherein said silane is cooled before it is irradiated.

* * * * *